United States Patent
Sung

(10) Patent No.: US 8,454,714 B2
(45) Date of Patent: Jun. 4, 2013

(54) DIAMOND GROWTH DEVICES AND METHODS

(76) Inventor: Chien-Min Sung, Tansui (TW)

(*) Notice: Subject to any disclaimer, the term of this patent is extended or adjusted under 35 U.S.C. 154(b) by 868 days.

(21) Appl. No.: 12/141,292

(22) Filed: Jun. 18, 2008

(65) Prior Publication Data
US 2008/0313968 A1  Dec. 25, 2008

Related U.S. Application Data

(63) Continuation-in-part of application No. 10/926,576, filed on Aug. 25, 2004, now Pat. No. 7,404,857, which is a continuation-in-part of application No. 10/791,300, filed on Mar. 1, 2004, now Pat. No. 7,323,049.

(60) Provisional application No. 60/936,205, filed on Jun. 18, 2007.

(51) Int. Cl.
| | | |
|---|---|---|
| B24D 3/02 | (2006.01) | |
| B24D 3/00 | (2006.01) | |
| B24D 11/00 | (2006.01) | |
| C09K 3/14 | (2006.01) | |
| B01J 3/06 | (2006.01) | |

(52) U.S. Cl.
USPC ............................ 51/307; 51/293; 423/446

(58) Field of Classification Search
USPC ............ 51/307; 117/10; 438/689; 423/290, 423/446
See application file for complete search history.

(56) References Cited

U.S. PATENT DOCUMENTS

| | | | |
|---|---|---|---|
| 2,947,611 A | 8/1960 | Bundy | |
| 3,030,188 A | 4/1962 | Eversole | |
| 3,238,019 A | 3/1966 | De Carli | |
| 3,401,019 A | 9/1968 | Cowan et al. | |
| 4,377,565 A | 3/1983 | Setaka | |
| 4,483,836 A | 11/1984 | Adadurov et al. | |
| 5,209,916 A | 5/1993 | Gruen | |
| 5,614,258 A | 3/1997 | Moskovits et al. | |
| 5,690,794 A | 11/1997 | Molchanov et al. | |
| 5,980,852 A | 11/1999 | Burns et al. | |
| 5,980,982 A * | 11/1999 | Degawa et al. | 427/185 |
| 6,315,871 B1 | 11/2001 | Daulton et al. | |
| 6,497,853 B1 | 12/2002 | Davies et al. | |
| 6,627,168 B1 | 9/2003 | Ohtsubo et al. | |
| 2004/0194689 A1 | 10/2004 | Sung | |
| 2005/0136667 A1* | 6/2005 | Sung | 438/689 |
| 2005/0255029 A1 | 11/2005 | Turpin et al. | |
| 2006/0016127 A1* | 1/2006 | Sung | 51/293 |
| 2006/0032429 A1 | 2/2006 | Sung | |

* cited by examiner

FOREIGN PATENT DOCUMENTS

| | | |
|---|---|---|
| EP | 0 290 044 | 11/1988 |
| EP | 0 322 217 | 6/1989 |

OTHER PUBLICATIONS

U.S. Appl. No. 11/407,385, filed Jul. 15, 2008; Sung.

*Primary Examiner* — Pegah Parvini
(74) *Attorney, Agent, or Firm* — Thorpe North & Western LLP

(57) ABSTRACT

Growth precursors to form discrete superabrasive particles including associated methods are disclosed. Such growth precursor may include a crystalline seed, an initiation material, and a feed material. The initiation material may substantially encompass the crystalline seed, and may include a catalyst and a raw material source. The raw material source makes up less than 50 wt % of the initiation material. The feed material may contact the initiation material and may also include raw material source and catalyst. The catalyst may be present in less than 50 wt % in the feed material. In one aspect, the growth precursor may be configured to form diamond particles.

32 Claims, 3 Drawing Sheets

DIAMOND GROWTH DEVICES AND METHODS

PRIORITY DATA

This application claims the benefit of United State Provisional Patent Application Ser. No. 60/936,205, filed on Jun. 18, 2007, which is incorporated herein by reference. This application is also a continuation-in-part of U.S. patent application Ser. No. 10/926,576, filed on Aug. 25, 2004 and now issued as U.S. Pat. No. 7,404,857, which is a continuation-in-part of U.S. patent application Ser. No. 10/791,300, filed Mar. 1, 2004 and now issued as U.S. Pat. No. 7,323,049.

FIELD OF THE INVENTION

The present invention relates generally to methods of synthesizing superabrasive particles. Accordingly, the present invention involves the chemical and material science fields.

BACKGROUND OF THE INVENTION

Diamond and cubic boron nitride (cBN) particles have found widespread use as superabrasives in a variety of abrading and cutting applications. The worldwide consumption of diamond particles currently exceeds 400 metric tons. Common tools which incorporate superabrasive particles include cutting tools, drill bits, circular saws, grinding wheels, lapping belts, polishing pads, and the like. Among diamond superabrasives, saw diamond has the largest particle size at about 18 to 60 mesh, i.e. 1 mm to 0.25 mm. High quality saw diamonds are generally euhedral having fully grown crystallographic faces. Further, high quality saw diamond ideally have very few defects or inclusions. Standard applications for saw diamonds require high quality diamonds. This is at least partially due to the high impact force encountered during cutting, particularly at high speeds. In contrast, smaller diamond particles, i.e. 60 to 400 mesh or 0.25 mm to 37 µm, such as those used in grinding wheels, create scratches in the surface, which gradually remove material from a workpiece. In such grinding applications, the impact force is typically much less than for cutting applications. Thus, commercially satisfactory smaller diamonds can be produced with less concern for flaws and impurities than is generally acceptable for larger diamonds such as saw diamonds.

Superabrasives are typically formed under ultrahigh pressure, e.g., about 5.5 GPa and high temperature, e.g., 1300° C. Under ultrahigh pressure conditions during crystal growth, the pressure tends to continually decay due to the volume contraction associated with diamond formation. Further, temperatures within the growth regions can increase due to increases in electrical resistance associated with the diamond formation. Hence, it is very difficult to maintain optimal conditions of pressure and temperature for homogeneous growth of diamond grits. Saw diamond grits are typically grown under ultrahigh pressure over a much longer time, e.g., 40 minutes than that required to grow smaller grinding grits, e.g., about 1 minute. Consequently, saw diamond grits are very difficult to grow, particularly those having high quality. Saw grits with high impact strength are characterized by a euhedral crystal shape and very low inclusions of either metal or graphite. Hence, very tight controls of pressure and temperature are required over extended periods of time to produce high quality diamonds. These difficulties partially account for the abundance of companies which can grow saw grits, while very few companies are capable of growing high grade saw grits having larger sizes.

Typical methods for synthesizing larger high quality diamonds involve ensuring uniformity of raw materials such as graphite and metal catalyst and carefully controlling process temperature and pressures. High pressure high temperature (HPHT) processes used in diamond growth can employ reaction volumes of over 200 cm$^3$. Most often, the graphite to diamond conversion in the reaction volume can be up to about 30%. Unfortunately, typical processes also result in the crystals having external flaws, e.g., rough surfaces, and undesirable inclusions, e.g., metal and carbon inclusions. Therefore, increased costs are incurred in segregating acceptable high strength diamonds from weaker, poor quality diamonds.

One major factor to consider in diamond synthesis of high grade saw diamonds is providing conditions such that nucleation of diamond occurs uniformly and nearly simultaneously. Random nucleation methods typically allow some regions of raw materials to be wasted while other regions are densely packed with diamond crystals having a high percentage of defects. Some diamond synthesis methods have improved nucleation uniformity somewhat; however, during diamond growth local changes in pressure can occur. If heating is accomplished by passing electrical current directly through the reaction cell, then diamond growth can also interfere with the electrical current used to control heating. The results of such interference are non-uniformities and fluctuations in the temperature and pressure gradients across the reaction cell and thus a wide distribution of crystal sizes, crystal shapes, and inclusion levels. Despite these difficulties, by providing highly homogeneous starting materials and carefully controlling process conditions, the volume efficiency of the reaction cell is still typically less than desired. This marginal yield still wastes large amounts of raw materials, reduces production efficiencies, and leaves considerable room for improvement.

Other methods for synthesizing large industrial diamond particles include forming layers of solid disks of graphite and/or solid disks of catalyst. Diamond nucleation then occurs at the interface between graphite and catalyst layers. The firing temperature for graphite rods that are cut into disks can vary from region to region, thus affecting the microstructure and composition of the disk. Further, during mechanical formation of graphite into a rod, the graphite microstructure can change, e.g., the outer regions exhibit a skin effect during extrusion. As a result, graphite disks tend to have regions which vary in porosity, degree of graphitization, ash content, and the like. Diamonds grown under such conditions tend to nucleate at different times and experience varying growth rates, thus producing diamonds having a wide size distribution and increasing the number of flawed diamonds due to intergrowth, overgrowth, i.e. fast growth rates, and uneven growth, i.e. asymmetric growth.

Recently, efforts have been made in using patterned placement of diamond seeds. However, diamond growth on the defined nucleation sites is greatly determined and limited by the materials surrounding the seeds. Diamond or other superabrasive particle growth goes through phases in the growth process. The materials needed at the beginning of the growth process are different from those necessary towards the end of processing. However, the growth conditions do not permit changing or altering the materials in-process. Without supplying the seeds with the proper materials at the proper stages in growth, the size and quality of synthetic diamonds will necessarily be limited.

SUMMARY OF THE INVENTION

Accordingly, the present invention provides growth precursors and methods for producing large superabrasive particles of good quality by supplying the crystalline seed the right materials throughout the growth process. In one aspect, for example, a growth precursor to form discrete superabrasive particles is presented. The growth precursor includes a crystalline seed substantially encompassed by an initiation material, and a feed material contacting the initiation material. The initiation material includes a catalyst and less than about 50 wt % of a raw material source. Conversely, the feed material includes a raw material source and less than about 50 wt % of catalyst.

By utilizing a growth precursor as outlined above, the seed, when placed under superabrasive growth conditions will find the initiation material conducive to beginning growth conditions. With growth, the required amounts of feed material and catalyst change, and in order to sustain growth and thus produce a larger particle, the growth precursor must be configured accordingly. Such is the case with the feed material contacting the initiation material. Thus, the growth precursors of the present invention are designed to encourage growth of large superabrasive particles of good quality.

In one detailed aspect, the crystalline seed can be diamond seed, cubic boron nitride (cBN) seed, SiC seed, or combinations thereof. In another detailed aspect, the initiation material can be a substantially homogeneous mixture of catalyst and raw material source. In yet another embodiment, the catalyst may be selected from the group consisting of alkali, alkali earth metal, and compounds thereof. Likewise, in another embodiment, the catalyst may be selected from the group of Fe, Ni, Co, Mn, Cr, and alloys thereof.

Specific arrangements of the crystalline seed and the materials can be varied according to the desired use. For example, the feed material can substantially encompass the initiation layer. In one embodiment, the crystalline seed is embedded in an initiation material layer. Furthermore, multiple crystalline seeds can be used. In one detailed embodiment, multiple seeds are placed in a predetermined pattern in relation to each other.

The method of the present invention can be applied to formation of superabrasives such as diamond and cubic boron nitride (cBN). The method entails subjecting a growth precursor of the type discussed herein to temperatures and pressures sufficient for the growth of superabrasive particles.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

Additional features and advantages of the invention will be apparent from the detailed description which follows, taken in conjunction with the accompanying drawings, which together illustrate, by way of example, features of the invention.

DETAILED DESCRIPTION OF THE INVENTION

Figure 1:
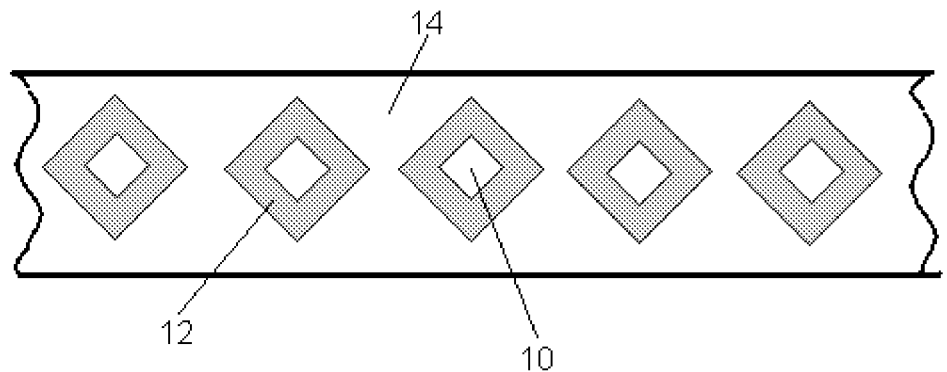
FIG. 1 is a cross-section view of a growth precursor in accordance with one embodiment of the present invention.

Reference will now be made to the exemplary embodiments illustrated in the drawings, and specific language will be used herein to describe the same. It will, nevertheless, be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

DEFINITIONS

In describing and claiming the present invention, the following terminology will be used in accordance with the definitions set forth below.

The singular forms "a," "an," and, "the" include plural referents unless the context clearly dictates otherwise. Thus, for example, reference to "a particle" includes reference to one or more of such particles, and reference to "the alloy" includes reference to one or more of such ceramics.

As used herein, "particulate" when used with respect to layers indicates that the layer is formed of particulates. Typically, particulate layers of the present invention can be loose powder, packed powder, or compacted powder having substantially no sintered particles. These particulate layers can be porous or semi-porous compacts. Compacted particulate layers can be formed using any known compaction process such as, but not limited to, wet or dry cold compaction such as cold isostatic pressing, die compacting, rolling, injection molding, slip casting, and the like. The particulate materials used in the present invention such as graphite and metal catalyst powders can be preferably handled and stored in an inert environment in order to prevent oxidation and contamination.

As used herein, "substantially free of" or the like refers to the lack of an identified element or agent in a composition. Particularly, elements that are identified as being "substantially free of" are either completely absent from the composition, or are included only in amounts that are small enough so as to have no measurable effect on the composition.

As used herein, "predetermined pattern" refers to a non-random pattern that is identified prior to formation of a precursor, and which individually places or locates each crystalline seed in a defined relationship with the other crystalline seeds. For example, "placing diamond seeds in a predetermined pattern" would refer to positioning individual particles at specific non-random and pre-selected positions. Further, such patterns are not limited to uniform grid or offset honeycomb patterns but may include any number of configurations based on the growth conditions and materials used.

As used herein, "uniform grid pattern" refers to a pattern of diamond particles that are evenly spaced from one another in at least a two-dimensional plane, and may further include even spacing in a three-dimensional space.

As used herein, "alloy" refers to a solid or liquid solution of a metal with a second material, said second material may be a non-metal, such as carbon, a metal, or an alloy which enhances or improves the properties of the metal.

As used herein, "crystalline seeds" refer to particles that serve as a starting material for growth of a larger crystalline particle. As used herein, crystalline seeds typically include diamond seeds, cubic boron nitride (cBN) seeds, and SiC seeds. For example, growth of superabrasive diamond is commonly achieved using diamond seeds; however cBN and/or SiC seeds can also be used to grow superabrasive diamond. Similarly, cBN can be grown using diamond, cBN, and/or SiC seeds.

As used herein, "diamond seeds" refer to particles of either natural or synthetic diamond, super hard crystalline, or polycrystalline substance, or mixture of substances and include but are not limited to diamond, polycrystalline diamond (PCD). Diamond seeds are used as a starting material for growing larger diamond crystals and help to avoid random nucleation and growth of diamond.

As used herein, "superabrasive particles" refers to particles suitable for use as an abrasive and include diamond and cBN particles.

As used herein, "precursor" refers to an assembly of crystalline seeds, particulate catalyst layer, and a raw material layer. A precursor describes such an assembly prior to the HPHT growth process. Such unsintered precursors are sometimes referred to as a "green body."

As used herein, "degree of graphitization" refers to the proportion of graphite which has graphene planes having a theoretical spacing of 3.354 angstroms. Thus, a degree of graphitization of 1 indicates that 100% of the graphite has a basal plane separation ($d_{(0002)}$) of graphene planes, i.e. with hexagonal network of carbon atoms, of 3.354 angstroms. A higher degree of graphitization indicates smaller spacing of graphene planes. The degree of graphitization, G, can be calculated using Equation 1.

$$G = (3.440 - d_{(0002)})/(3.44 - 3.354) \quad (1)$$

Conversely, $d_{(0002)}$ can be calculated based on G using Equation 2.

$$d_{(0002)} = 3.354 + 0.086(1-G) \quad (2)$$

Referring to Equation 1, 3.440 angstroms is the spacing of basal planes for amorphous carbon ($L_c=50$ Å), while 3.354 angstroms is the spacing of pure graphite ($L_c=1000$ Å) that may be achievable by sintering graphitizable carbon at 3000° C. for extended periods of time, e.g., 12 hours. A higher degree of graphitization corresponds to larger crystallite sizes, which are characterized by the size of the basal planes ($L_a$) and size of stacking layers ($L_c$). Note that the size parameters are inversely related to the spacing of basal planes. Table 1 shows crystallite properties for several common types of graphite.

TABLE 1

| Graphite Type | $d_{(002)}$ | $L_a$ (Å) | $L_c$ (Å) | $I_{112}/I_{110}$ |
|---|---|---|---|---|
| Natural | 3.355 | 1250 | 375 | 1.3 |
| Low Temp (2800° C.) | 3.359 | 645 | 227 | 1.0 |
| Electrode | 3.360 | 509 | 184 | 1.0 |
| Spectroscopic | 3.362 | 475 | 145 | 0.6 |
| High Temp (3000° C.) | 3.368 | | 400 | 0.9 |
| Low Ash | 3.380 | 601 | 180 | 0.8 |
| Poor Natural | 3.43 | 98 | 44 | 0.5 |

As used herein, "inclusion" refers to formation of carbon or metal deposits instead of diamond at the interface between a growth surface of the diamond and the surrounding material. Inclusions are most often formed by the presence of substantial amounts of carbon at the growth surface of the diamond and/or inadequate control of temperature and pressure conditions during HPHT growth. Similar inclusions and defects can also be formed during cBN synthesis.

As used herein, "euhedral" means idiomorphic or a crystal having an unaltered natural shape containing natural crystallographic faces.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

THE INVENTION

Reference will now be made to the drawings in which the various elements of the present invention will be given numeral designations and in which the invention will be discussed. It is to be understood that the following description is only exemplary of the principles of the present invention, and should not be viewed as narrowing the appended claims.

The present invention includes a growth precursor to form discrete superabrasive particles. The growth precursor includes a crystalline seed, an initiation material and a feed material. The initiation material substantially encompasses the crystalline seed, and the feed material contacts the initiation material. The initiation material is made up of both a catalyst and less than 50 wt % of a raw material source. The feed material is made up of both a raw material source and less than about 50 wt % of a catalyst.

At the initial stages of superabrasive particle processing, the crystalline seed is ideally substantially enveloped with catalyst material. Raw material is dissolved in the catalyst and, when the catalyst is saturated with raw material, the raw material can crystallize out, attaching to the seed, and thus grow the superabrasive particle. As such, it is important that the crystalline seed have adequate amounts of catalyst to substantially envelope it. In some aspects, the catalyst is not included in the growing superabrasive particle (i.e. substantially no inclusions are created). The catalyst, then, can remain as a layer or film substantially surrounding the growing seed. As the seed grows in size, the thickness of the film becomes thinner as it is stretched. Because the catalyst material is not consumed in the processing, it can be useful to supply only a minimal amount of catalyst material sufficient to continue growth, which is an amount that provides for a substantially continuous film enveloping the growing seed. On the other hand, if too much catalyst is present throughout particle growth, the particle can be starved for raw material, and therefore growth can be slowed or even halted. The dissolved raw material, however, is converted into the superabrasive material. The growing process consumes raw material. As the seed enlarges, there is a greater demand for raw material. Therefore, according to the present invention, the growth precursor can be configured to provide ample amount of catalyst initially, and an amount sufficient to maintain a catalyst coating around the growing seed. The growth precursor can further include raw material in amounts and at distances in relation to the seed that can be utilized by the growing seed.

The crystalline seed can be a variety of materials. Non-limiting examples of crystalline seeds include diamond seed, cBN seed, and SiC seed, and combinations thereof. More than one seed may be used. In one embodiment, a plurality of crystalline seeds can be used. In such case, the crystalline seeds can be the same material (e.g. all diamond seeds), or can be a mixture of any number and variety of crystalline seeds. In a detailed embodiment, the crystalline seed is a diamond seed. Likewise, in an alternate detailed embodiment, the crystalline seed is a cBN seed.

Typically, the crystalline seeds can have a diameter of from about 30 μm to about 500 μm, and preferably from about 55 μm to about 500 μm. However, the present invention is ideally suited to growth of almost any size crystalline seed. Allowing for larger crystalline seeds also reduces the growth time required to produce large superabrasive particles. In particular, diamond seeds suitable for use in the present invention can be larger than typical diamond seeds, i.e. from about 200 μm to about 500 μm, although the above ranges can also be effectively used. As a general guideline, typically crystalline seeds can have an average diameter from about 0.05 to about 0.2 times the average diameter of the desired grown superabrasive particles. In one detailed aspect, suitable diamond seeds can be type IIa diamond and may be synthetic or natural diamond. Alternatively, synthetic cBN or SiC seeds can be used.

As mentioned, the initiation material includes both catalyst and raw material source. Although the raw material source is present in an amount less than about 50 wt %, the amounts of both catalyst and raw material source can vary within that constraint. Specifically, the raw material source can comprise less than about 40 wt %, or further less than about 30 wt %, and still further less than 20 wt %. Additionally, the raw material source can be present in quantities greater than 2 wt %, greater than 5 wt %, greater than 10 wt %, greater than 15 wt %, greater than 20 wt % and greater than 30 wt %. The noted constraints on the amount of raw material source in the initiation material can be stated as combinations of the upper and lower boundaries—for example, from 5 wt % to 20 wt %, from 20 wt % to 30 wt %, etc. The initiation material should have catalyst sufficient to substantially envelope the seed and thus allow particle growth. The raw material can be present so as to dissolve in the molten catalyst (when conditions of processing cause the catalyst to be in a molten state) and precipitate out to grow the superabrasive particulate.

The initiation material can comprise additives and additional material, or can be composed of catalyst and raw material source only. In one aspect, the catalyst and the raw material source form a homogeneous mixture. The catalyst in the initiation material and in the feed material can be the same material, can contain some of the same components, or can be different. Likewise, the raw material source can be the same, similar, or different in the initiation material and the feed material.

The raw material source can include any materials that are capable of providing raw materials for growth of a desired superabrasive particle. Specifically, a carbon source can be used for diamond growth, while a low pressure-phase boron nitride such as hexagonal boron nitride can be used for cBN growth. Under diamond growth conditions, the raw material source can comprise a carbon source such as graphite, amorphous carbon, diamond powder, and the like. In one aspect of the present invention, the carbon source can comprise graphite. Although a variety of carbon source materials can be used, graphite generally provides good crystal growth and improves homogeneity of the grown diamonds. When graphite is used as the carbon source, preferably the carbon source comprises at least about 85 wt % graphite. For embodiments wherein the graphite is formed as a particulate layer, suitable graphite powder can typically be from about 1 μm to about 1 mm. In one detailed aspect of the present invention, the graphite can have a degree of graphitization of greater than 0.50. Preferably, the graphite can have a degree of graphitization of from about 0.75 to about 1, and most preferably from about 0.85 to about 1. Experiments have shown that a higher degree of graphitization corresponds to larger crystallite sizes and improved grown diamond quality and uniformity. Diamond is typically formed through puckering and bending of graphene planes in the presence of molten catalyst metal. Therefore, diamond formation can be improved by providing graphite having a high degree of graphitization.

As with the raw material source, a catalyst is present in both the initiation material and the feed material. The catalyst is present in the feed material in an amount of less than about 50 wt %. Further aspects of the invention note that the catalyst can comprise less than about 30 wt %, or further less than about 20 wt %, and still further less than 10 wt %, and even less than about 5 wt %. Additionally, the catalyst can be present in quantities greater than 1 wt %, greater than 2 wt %, greater than 5 wt %, greater than 10 wt %, greater than 20 wt % and greater than 30 wt %. The noted constraints on the amount of catalyst in the feed material can be stated as combinations of the upper and lower boundaries—for example, from 2 wt % to 5 wt %, from 10 wt % to 30 wt %, etc. The feed material provides a growing particle with raw material that is converted to superabrasive particulate material. The catalyst material is preferably not consumed in the growth process, and therefore should be present in an amount so as to add to the catalyst film or layer surrounding the growing particle, such that the catalyst is preferably continuous and of a thickness sufficient to maintain growth of the seed.

In one detailed aspect of the present invention, the catalyst can comprise a catalyst material that is suitable for growth of the desired superabrasive particle. Catalyst materials suitable for diamond synthesis can include metal catalyst powder comprising any metal or alloy which is a carbon solvent capable of promoting growth of diamond from carbon source materials. Non-limiting examples of suitable metal catalyst materials can include or consist essentially of Fe, Ni, Co, Mn, Cr, and mixtures or alloys thereof. Several common metal catalyst alloys can include Fe—Ni, e.g., INVAR alloys, Fe—Co, Ni—Mn—Co, and the like. Currently preferred metal catalyst materials are Fe—Ni alloys, such as Fe-35Ni, Fe-31Ni-5Co, Fe-30Ni, and other INVAR alloys, with Fe-35Ni being most preferred and more readily available. In a detailed embodiment, the catalyst is an Fe—Ni alloy having about 65 wt % Fe and about 35 wt % Ni. In addition, the catalyst materials under diamond synthesis can include additives that control the growth rate of diamond, i.e. via suppressing carbon diffusion, and also prevent excess nitrogen and/or oxygen from diffusing into the diamond. Suitable additives can include Mg, Ca, Si, Mo, Zr, Ti, V, Nb, Zn, Y, W, Cu, Al, Au, Ag, Pb, B, Ge, In, Sm, and compounds of these materials with C and B.

Similarly, catalysts suitable for cBN synthesis can include any catalyst material capable of promoting growth of cBN from suitable boron nitride raw materials. Non-limiting examples of suitable catalyst materials for cBN growth include alkali metals, alkali earth metals, and compounds thereof. Several specific examples of such catalyst materials can include lithium, calcium, magnesium, nitrides of alkali and alkali earth metals such as $Li_3N$, $Ca_3N_2$, $Mg_3N_2$, $CaBN_2$, and $Li_3BN_2$. The catalyst materials under cBN synthesis can further include very minor amounts of additives that control the growth rate of cBN crystal such as Si, Mo, Zr, Ti, Al, Pt, Pb, Sn, B, C, and compounds of these materials with Si, B, and N.

In one aspect of the present invention, the feed material can be a particulate layer. In one embodiment of the present invention, the feed material can be provided as a loose powder. The loose powder can be placed in a mold and optionally pressed using any known pressing technique. For example, the powder can be pressed using cold isostatic pressing at about 200 Mpa. Using particulate layers can provide ease of arranging the crystalline seed(s) and feed material.

Likewise, the initiation material can be formed into a particulate layer. The initiation material of the present invention can be formed as a loose powder, porous compact or other substantially non-sintered mass. Loose powder can be used directly by placing the powder in a suitable mold adjacent to the raw material layer. This loose powder can be optionally pressed using known pressing technologies to form a disk. Alternatively, the initiation material powder can be formed into a disk and then subsequently placed adjacent the feed material layer. In a preferred embodiment, the initiation material contains no binder, no oils, and no organic materials. Providing a feed material in a layered form allows for crystalline seeds to be easily embedded in the raw material layer, as described in more detail below. In an optional embodiment, feed material layer(s) and initiation material can be pressed together to form a convenient assembly for use in the methods of the present invention.

Referring to FIG. 1, one embodiment of the present invention is illustrated. Crystalline seeds 10 are encompassed with initiation material 12. The crystalline seeds with feed material are then embedded in a layer of feed material 14. The feed material substantially encompasses the initiation material in this embodiment. Certainly this design, and all of the illustrated configurations, has multiple variations that are within the scope of the present invention. FIG. 1 also illustrates the plurality of crystalline seeds in a pattern. Although the pattern could be any design, the illustrated embodiment shows the currently preferred pattern wherein the crystalline seeds are evenly spaced from other crystalline seeds.

Figure 2:
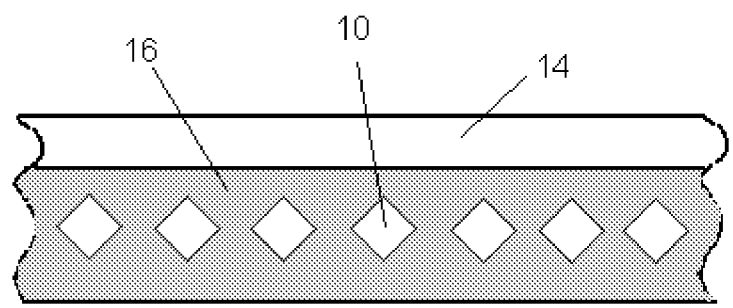
FIG. 2 is a cross-section view of a growth precursor in accordance with another embodiment of the present invention.
Figure 3:
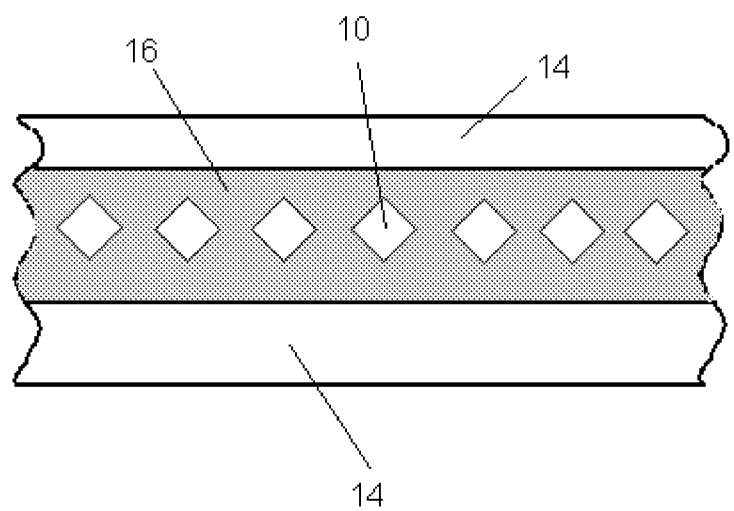
FIG. 3 is a cross-section view of a growth precursor in accordance with yet another embodiment of the present invention.

FIGS. 2 and 3 show additional configurations of the present invention. FIG. 2 illustrates crystalline seeds 10 embedded in an initiation material layer 16, such that the initiation material directly contacts and substantially encompasses the crystalline seeds. The feed material 14 is a layer in direct contact with the layer of initiation material. FIG. 3 shows a similar configuration, however the layer of initiation material 16 is sandwiched between two layers of feed material, each denoted by 14.

Figure 4:
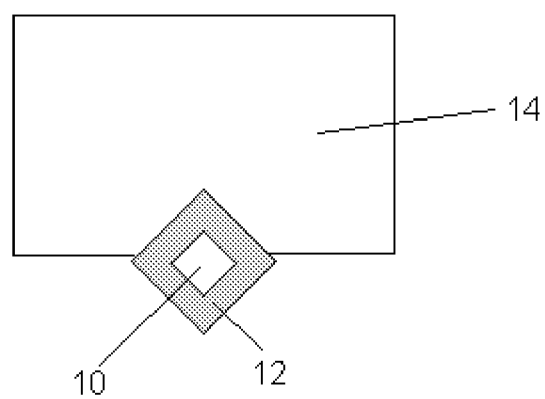
FIG. 4 is a cross-section view of a growth precursor in accordance with still another embodiment of the present invention.

An alternate configuration is shown in FIG. 4. The crystalline seed 10 is encompassed with initiation material 12. A portion of the initiation material is in contact with the feed material 14. Such configuration, and variations thereof, may be useful in specific high pressure apparatuses. Additionally, the configuration may have the distinction of encouraging crystal growth in designated directions. As illustrated, the crystalline seed, when placed in growth conditions, would be expected to grow from the seed in the directions wherein the initiation material is in contact with the feed material.

Both the initiation material and the feed material can be homogeneous mixtures, or one or both of them can be heterogeneous. In one aspect, one or both of the materials may be layered or arranged in a predetermined heterogeneous design. For example, the feed material, as shown in any of the examples, may be made up of layers of material. To expound further on this proposed example, the layer of the feed material nearest the initiation material (i.e. in contact with the initiation material) can be composed of 40 wt % catalyst and 60 wt % raw material source. The next layer (and thus further away from the crystalline seed), can be 30 wt % catalyst and 70 wt % raw material source. The subsequent layer can be 20 wt % catalyst, and so on. This can also work likewise with the initiation material. Typically, it is desirable to have a greater amount of catalyst in closer proximity to the crystalline seed(s). In this manner, a gradient of materials is created which can sustain growth of crystalline seeds for a greater amount of time, and thus has the potential of producing larger superabrasive particles.

The above-recited assembly configurations allow for various fluctuations in the ratio of growth material (e.g. graphite) to catalyst (e.g. metal) that is used in the present invention. In one aspect, the ratio of growth material to catalyst may be from about 1:1.1 to about 1:3. In another aspect, the ration may be about 1:2. In some aspects, this ratio may be particularly useful when the assembly configuration is a layered structure. In another aspect, the ratio may be about 1:1.5. In some aspects, this ratio may be especially useful when the assembly configuration is a powdered mixture. In other aspects, the gradient of growth material to catalyst may be about 1:2 at locations proximal to the seed crystals and may transition to a ratio of about 2:1 at locations distal from the seed crystals. In some aspects the gradient of transition may be gradual, and in other aspects, bands or discrete layers or sections of differing ratios of materials may be included in the gradient.

Consistent with the present invention, and as outlined above, the initiation and feed materials can be configured to produce desirable gradients. Such design can vary the content of the layers consistent with the present invention, the number and size of the layers, the location and shape of the layers, etc. Therefore, in some aspects, the layers can produce a stepwise gradient where the changes in material content from one layer to another are very distinct. In another aspect, the layers can be configured to produce a more continuous gradient-type arrangement of materials wherein changes in material content are gradual and present throughout a majority of the layer or precursor. An aspect of the design is to have homogeneous layers in the feed material, the initiation material, or both materials. In a further aspect, each layer individually meets the requirements for the initiation material or the feed material. To explain, all layers in the feed material would have both raw material source and less than 50 wt % catalyst.

By placing crystalline seeds in a regular predetermined pattern, growth conditions can be optimized to efficiently use available growth volumes, increase crystal quality, and decrease size distribution of grown superabrasive particles. Arrangement of crystalline seeds in the predetermined pattern can be accomplished in any number of ways. In one embodiment, the crystalline seeds can be arranged in a predetermined pattern using a template to guide placement of the seeds. Such seed positioning is discussed at length in Applicant's copending U.S. patent application Ser. No. 10/791,300, filed Mar. 1, 2004, and incorporated herein by reference.

Figure 5:
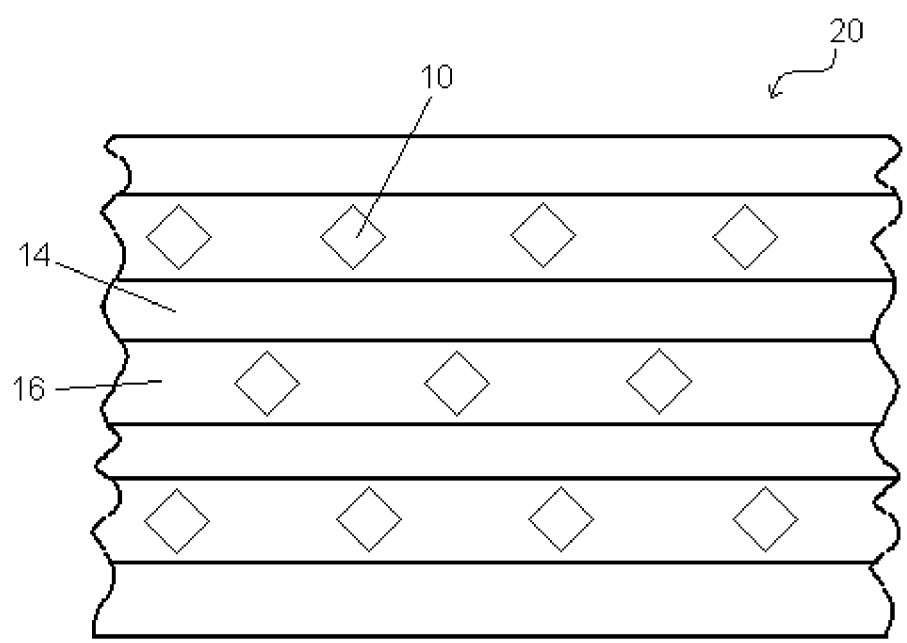
FIG. 5 is a cross-sectional view of a multi-layered growth precursor in accordance with an embodiment of the present invention.

Referring now to FIG. 5, additional layers of material can be formed to improve efficient use of an HPHT apparatus cell volume. The thickness of each layer can depend on the diameter of the crystalline seeds 20 and the projected diameter of the final grown superabrasive particles. The predetermined pattern in each particulate catalyst layer can be configured such that upon assembling layers as in FIG. 5, the assembly also exhibits a predetermined pattern across the thickness of the growth precursor 20. The pattern shown in FIG. 5 is an offset pattern; however any suitable arrangement can be used, as long as grown crystals do not impinge on neighboring grown crystals. Typically, the particulate initiation material layers 16 can have a thickness of from about 50 μm to about 500 μm, while the feed material layers 14 can have a thickness of from about 70 μm to about 1 mm. Those skilled in the art will recognize that thicknesses and configurations outside of the identified ranges can also be used.

Typical HPHT reaction cells can have a reaction volume of from about 15 $cm^3$ to about 100 $cm^3$. Therefore, it is often practical to include a large number of layers in the growth precursor in order to fully utilize available reaction volume for crystal growth. In one aspect of the present invention, the growth precursor can have from about 3 to about 50 layers. In addition, formation of each layer and placement of crystalline seeds can be preceded or followed by a pressing step in order to reduce porosity and improve the cohesiveness of the growth precursor. Thus, in one preferred embodiment, each layer can be pressed prior to pressing the entire multi-layer growth precursor. Pressing can be preferably accomplished by cold isostatic pressing although other pressing techniques can also be used.

As mentioned above, the crystalline seeds can be placed in a predetermined pattern using any number of methods. Those of ordinary skill in the art will recognize a variety of ways for locating particles at desired locations on a surface or substrate. A number of techniques have been developed for placing superabrasive particles in a pattern for production of abrasive tools. For example, U.S. Pat. Nos. 2,876,086; 4,680,199; 4,925,457; 5,380,390; and 6,286,498, each of which is incorporated by reference, disclose methods of placing superabrasive particles in a pattern for forming various abrasive tools. Alternatively, crystalline seeds can be randomly distributed throughout a layer and/or precursor consistent with the present invention.

In yet another embodiment of the present invention, a method of producing superabrasive particles can include placing a growth precursor in a reaction vessel. The growth precursor can then be subjected to temperature and pressure sufficient for the growth of superabrasive particles. Such method produces grown superabrasive particles. The grown superabrasive particles can vary greatly in size, and are affected by the materials used, their configuration, and the temperature, pressure and time. In one embodiment, however, the method produces a superabrasive particle having a weight of greater than about 1 carat/cubic centimeter. In a further embodiment, the superabrasive particle can have a weight of greater than about 2 carats/cubic centimeter, and 3 carats/cubic centimeter. In still further embodiments, the superabrasive particles can have a weight of greater than about 4 carats/cubic centimeter, greater than about 5 carats/cubic centimeter, and even greater than about 6 carats/cubic centimeter.

Typical growth conditions can vary somewhat, however the temperature can be from about 1000° C. to about 1400° C. and the pressure can be from about 4 to about 7 GPa. The appropriate temperature can depend on the catalyst material chosen. As a general guideline, the temperature can be from about 10° C. to about 200° C. above a melting point of the catalyst. Growth time can typically be from about 5 minutes to about 2 hours.

Random or patterned placement of crystalline seeds can be used. The patterned placement of crystalline seeds in the present invention also allows for better utilization of materials in the reaction cell as there is less material wasted or in competition. As seeds grow too near to each other, they can compete for raw material sources and one or both may experience stunted or halted growth due to the shortage of raw material. Alternatively, if seeds are too far apart, there is an amount of raw material, and therefore reaction volume, wasted as they cannot be properly utilized for the production of superabrasive particles.

Placement of seeds can affect the growth conditions throughout the growth cell. For example, temperature and pressure can deviate from about 1% to about 10%, and in some cases can be from about 3% to about 5%. This allows for less strict control of process conditions than conventional methods, while also maintaining the quality of grown superabrasive particles.

As the precursor is subjected to HPHT conditions, the catalyst nearest the seed can turn to a molten state capable of dissolving a portion of the raw material. Once molten catalyst is saturated with raw material, the raw material will precipitate out of the molten catalyst in the form of superabrasive material and will attach to the crystalline seed. As raw material precipitates out of the molten catalyst, additional raw material can be introduced to the catalyst, forming a continuous precipitating process and thereby growing the superabrasive particle. As the superabrasive particle grows, the molten catalyst may require additional catalyst material to maintain a film or layer substantially surrounding the growing particle. Such catalyst material is naturally available to the molten catalyst layer as a result of the seed growing near or into the feed material of the present invention. The feed material is also rich in raw material, which is required for the growth of the seed. The demand for raw material continues to grow as the particle grows, as long as conditions, e.g. pressure, temperature, permit growth.

To produce greater yield and better quality superabrasive particles, the reaction conditions should be held as constant as possible. In some cases, this may require specialized equipment. For example, the synthesis of graphite as a raw material to produce diamond particles naturally experiences pressure decay as the graphite is converted to diamond. As processes become more efficient regarding use of materials in the reaction volume, this pressure decay is more apparent, at greater amounts, and can even be detrimental to the process. When pressure decays below a point required for processing, the diamond growth is halted and can even back convert. As such, specialized equipment capable of maintaining pressures, or reducing pressure decay, may be useful in superabrasive processing. Use of such equipment, and thus maintaining growth conditions for prolonged time, along with the teachings outlined herein, can produce diamond yields much larger than previously attained.

The volume of diamond that can be grown using the present invention may in some aspects exceed about 17% of the volume efficiency of the materials and HPHT apparatus chamber. In other aspects, the volume achieved may be higher than 20-40% of the volume efficiency, or even higher.

The following examples present various methods for growing diamond according to certain embodiments of the present invention. Such examples are illustrative only, and no limitation on present invention is meant thereby.

EXAMPLES

Example 1

An initiation material is prepared by mixing 7 wt % purified graphite with a degree of graphitization of 0.8 and 93% high purity INVAR (Fe-35Ni) to form a homogeneous mixture. The mixture is cold pressed at 150 MPa to form a particulate compact disk. A template is used to place diamond seeds having a mesh size of 120/140 (about 115 μm in diameter) on the compact disk. A metal plate is used to press the diamond seeds into the initiation material layer such that each of the diamond seeds is about two-thirds surrounded by the initiation material. Subsequently, additional initiation material (the homogeneous mixture) is layered over the diamond seeds. The additional initiation material is cold pressed at 150 MPa. The feed material is prepared by mixing 10 wt % of INVAR and 90 wt % of purified graphite with a degree of graphitization of 0.8 to form a homogeneous mixture. The feed material is distributed to form a layer on the pressed initiation material and then cold pressed at 150 MPa.

Example 2

Same as Example 1, except the INVAR of the feed material is replaced with Fe.

Example 3

Same as Example 1, except the INVAR of the feed material and of the initiation material is replaced with Fe.

Example 4

Same as Example 1, except the graphite is replaced with hexagonal boron nitride, the diamond seeds are replaced with cBN seeds, and the INVAR is replaced with $Ca_3N_2$.

Example 5

Same as Example 1, except eight additional alternating layers of initiation material embedded with diamond seeds and feed material are formed to produce a diamond growth precursor. Exterior surfaces of the diamond growth precursor are coated with a 200 μm layer of iron.

Example 6

The diamond growth precursor of Example 5 is then placed in a belt apparatus. The precursor is subjected to a pressure of about 5.2 GPa and heated to a temperature of about 1260° C. for about one hour. The layered grown diamond assembly is then cooled and removed from the belt apparatus. The assembly is partially crushed to reveal grown diamonds.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A growth precursor to form discrete superabrasive particles, comprising:
    a) a crystalline seed;
    b) an initiation material completely encompassing the crystalline seed, said initiation material comprising a catalyst, and a raw material source; and
    c) a feed material contacting the initiation material, said feed material comprising a raw material source and a catalyst, wherein the initiation material comprises a raw material source in an amount of less than about 40 wt %.

2. The precursor of claim 1, wherein the crystalline seed is a member selected from the group consisting of diamond seed, cBN seed, SiC seed, and combinations thereof.

3. The precursor of claim 2, wherein the crystalline seed is a diamond seed.

4. The precursor of claim 1, wherein the initiation material is a substantially homogeneous mixture of the catalyst and the raw material source.

5. The precursor of claim 1, wherein the superabrasive particle is diamond and the raw material source of the initiation material is a carbon source.

6. The precursor of claim 1, wherein the feed material comprises a catalyst in an amount of less than about 30 wt %.

7. The precursor of claim 1, wherein the superabrasive particle is cubic boron nitride and the raw material of the initiation material is a hexagonal boron nitride.

8. The precursor of claim 1, wherein the catalyst of the initiation material is a member selected from the group consisting of alkali, alkali earth metal, and compounds thereof.

9. The precursor of claim 1, wherein the catalyst is a member selected from the group consisting of Fe, Ni, Co, Mn, Cr, and alloys thereof.

10. The precursor of claim 1, wherein the crystalline seed is from about 30 μm to about 500 μm in diameter.

11. The precursor of claim 1, wherein the feed material substantially encompasses the initiation material.

12. The precursor of claim 1, comprising a plurality of crystalline seeds.

13. The precursor of claim 1, wherein the crystalline seeds are placed in a predetermined pattern in relation to other crystalline seeds.

14. The precursor of claim 1, wherein the crystalline seed is embedded in an initiation material layer.

15. A method of producing superabrasive particles, comprising the steps of
    a) placing a growth precursor in a reaction vessel, said growth precursor comprising
        i) a crystalline seed;
        ii) an initiation material completely encompassing the crystalline seed, said initiation material comprising a catalyst and a raw material source wherein the initiation material comprises a raw material source in an amount of less than about 40 wt %; and iii) a feed material contacting the initiation material, said feed material comprising a raw material source and a catalyst; and b) subjecting the growth precursor to temperature and pressure sufficient for growth of superabrasive particles to produce grown superabrasive particles.

16. The method of claim 15, wherein the superabrasive particle has a weight of greater than about 2 carat/cubic centimeter.

17. The method of claim 15, wherein the crystalline seed is a diamond seed.

18. The method of claim 15, wherein the initiation material is substantially homogeneous.

19. A growth precursor to form discrete superabrasive particles, comprising:
a) a crystalline seed;
b) an initiation material completely encompassing the crystalline seed, said initiation material comprising a catalyst, and a raw material source; and
c) a feed material contacting the initiation material, said feed material comprising a raw material source and a catalyst, wherein the feed material comprises a catalyst in an amount of less than about 30 wt %.

20. The precursor of claim 19, wherein the crystalline seed is a member selected from the group consisting of diamond seed, cBN seed, SiC seed, and combinations thereof.

21. The precursor of claim 20, wherein the crystalline seed is a diamond seed.

22. The precursor of claim 19, wherein the initiation material comprises a raw material source in an amount of less than about 40 wt %.

23. The precursor of claim 19, wherein the initiation material is a substantially homogeneous mixture of the catalyst and the raw material source.

24. The precursor of claim 19, wherein the superabrasive particle is diamond and the raw material source of the initiation material is a carbon source.

25. The precursor of claim 19, wherein the superabrasive particle is cubic boron nitride and the raw material of the initiation source is a hexagonal boron nitride.

26. The precursor of claim 19, wherein the catalyst of the initiation material is a member selected from the group consisting of alkali, alkali earth metal, and compounds thereof.

27. The precursor of claim 19, wherein the catalyst is a member selected from the group consisting of Fe, Ni, Co, Mn, Cr, and alloys thereof.

28. The precursor of claim 19, wherein the crystalline seed is from about 30 µm to about 500 µm in diameter.

29. The precursor of claim 9, wherein the feed material substantially encompasses the initiation material.

30. The precursor of claim 19, comprising a plurality of crystalline seeds.

31. The precursor of claim 19, wherein the crystalline seeds are placed in a predetermined pattern in relation to other crystalline seeds.

32. The precursor of claim 19, wherein the crystalline seed is embedded in an initiation material layer.

* * * * *